(12) United States Patent
Pohl et al.

(10) Patent No.: US 12,023,996 B2
(45) Date of Patent: Jul. 2, 2024

(54) DOOR ASSEMBLY WITH TRANSMITTER AND RECEIVER UNITS FOR THE WIRELESS TRANSMISSION OF ENERGY AND/OR DATA

(71) Applicant: Brose Fahrzeugteile SE & Co. Kommanditgesellschaft, Bamberg, Bamberg (DE)

(72) Inventors: Florian Pohl, Ebersdorf (DE); Mark Wagner, Breitengüßbach (DE); Thomas Salhoff, Hallstadt (DE); Manfred Stenzel, Bamberg (DE)

(73) Assignee: Brose Fahrzeugteile SE & Co. Kommanditgesellschaft, Bamberg (DE)

(*) Notice: Subject to any disclaimer, the term of this patent is extended or adjusted under 35 U.S.C. 154(b) by 262 days.

(21) Appl. No.: 17/281,706

(22) PCT Filed: Sep. 26, 2019

(86) PCT No.: PCT/EP2019/075996
§ 371 (c)(1),
(2) Date: Mar. 31, 2021

(87) PCT Pub. No.: WO2020/069958
PCT Pub. Date: Apr. 9, 2020

(65) Prior Publication Data
US 2022/0001724 A1 Jan. 6, 2022

(30) Foreign Application Priority Data
Oct. 1, 2018 (DE) .................... 10 2018 124 213.1

(51) Int. Cl.
*E05F 15/20* (2006.01)
*B60J 1/17* (2006.01)
(Continued)

(52) U.S. Cl.
CPC ............... *B60J 1/17* (2013.01); *B60J 5/0416* (2013.01); *E05F 15/689* (2015.01);
(Continued)

(58) Field of Classification Search
CPC .......... B60J 1/17; B60J 5/0416; E05F 15/689; E05F 11/38; E05Y 2201/684;
(Continued)

(56) References Cited

U.S. PATENT DOCUMENTS 4,939,867 A * 7/1990 Harada ................. E05F 15/689
49/362
5,537,782 A * 7/1996 Klippert ................ E05F 15/689
49/358
(Continued)

FOREIGN PATENT DOCUMENTS

AU    2014271184 A1 * 12/2015
CN    203519956 U    4/2014
(Continued)

*Primary Examiner* — Jerry E Redman
(74) *Attorney, Agent, or Firm* — Dickinson Wright PLLC

(57) ABSTRACT

A door assembly, with at least one vehicle door, a carrier component, which is provided in the vehicle door and carries at least one functional component of the vehicle door, a window pane, which is adjustable in relation to the carrier component, for a window opening on the vehicle door, a window-side receiver unit for the wireless reception of energy and/or data, and a carrier-component-side transmitter unit for the wireless transmission of energy and/or data to the window-side receiver unit.

18 Claims, 9 Drawing Sheets

(51) Int. Cl.
*B60J 5/04* (2006.01)
*E05F 15/689* (2015.01)

(52) U.S. Cl.
CPC ..... *E05Y 2201/684* (2013.01); *E05Y 2400/40* (2013.01); *E05Y 2400/66* (2013.01); *E05Y 2400/818* (2013.01); *E05Y 2900/55* (2013.01)

(58) Field of Classification Search
CPC ............ E05Y 2400/40; E05Y 2400/66; E05Y 2400/818; E05Y 2400/65; E05Y 2900/55; E05Y 2800/20
USPC ........................................................... 49/25
See application file for complete search history.

(56) References Cited

U.S. PATENT DOCUMENTS

| | | | | |
|---|---|---|---|---|
| 5,698,906 | A * | 12/1997 | Gardner | G02B 5/32 359/24 |
| 6,976,726 | B2 | 12/2005 | Hirota et al. | |
| 8,994,495 | B2 * | 3/2015 | Dassanayake | G07C 9/00174 340/5.23 |
| 9,898,142 | B2 | 2/2018 | Tu et al. | |
| 10,137,857 | B1 * | 11/2018 | Siddiqui | B60R 25/255 |
| 10,279,659 | B2 * | 5/2019 | Salter | F21V 9/30 |
| 10,420,189 | B2 * | 9/2019 | Salter | B60Q 1/04 |
| 10,427,503 | B2 * | 10/2019 | Snider | B60J 1/20 |
| 10,427,504 | B2 * | 10/2019 | Mueller | E05F 15/665 |
| 10,576,893 | B1 * | 3/2020 | Salter | G03B 21/2033 |
| 10,599,260 | B1 * | 3/2020 | Salter | B60K 37/06 |
| 10,654,343 | B2 * | 5/2020 | Kang | H02J 50/80 |
| 10,719,287 | B2 * | 7/2020 | Brown | G06F 3/1446 |
| 10,726,812 | B2 * | 7/2020 | Hélot | G09G 5/37 |
| 10,769,874 | B2 * | 9/2020 | Salter | G06F 3/0416 |
| 10,850,711 | B2 * | 12/2020 | Salter | B60R 11/0264 |
| 10,858,875 | B2 * | 12/2020 | Reul | E06B 7/28 |
| 10,866,414 | B2 * | 12/2020 | Zhang | G02B 27/0101 |
| 10,870,336 | B2 * | 12/2020 | Snider | G08B 21/182 |
| 10,899,298 | B2 * | 1/2021 | Kang | B60J 1/2016 |
| 10,960,762 | B2 * | 3/2021 | Mertens | G09G 5/38 |
| 11,117,469 | B2 * | 9/2021 | Horna | G09G 5/14 |
| 11,170,239 | B2 * | 11/2021 | Kim | G06N 20/00 |
| 11,214,194 | B2 * | 1/2022 | Thorngren | B60Q 1/324 |
| 11,221,622 | B2 * | 1/2022 | Schwie | G05D 1/0088 |
| 11,318,818 | B2 * | 5/2022 | Arimoto | E05F 15/689 |
| 11,530,567 | B2 * | 12/2022 | Nam | B60J 1/17 |
| 2006/0042167 | A1 * | 3/2006 | Dedrich | E05F 15/689 49/358 |
| 2006/0059782 | A1 * | 3/2006 | Garcia | B60R 16/0215 49/358 |
| 2006/0207183 | A1 * | 9/2006 | Hiramatsu | E05F 15/689 49/358 |
| 2009/0322706 | A1 * | 12/2009 | Austin | G06F 3/038 345/175 |
| 2012/0200150 | A1 * | 8/2012 | Urano | B60L 53/126 307/104 |
| 2014/0015637 | A1 | 1/2014 | Dassanayake et al. | |
| 2014/0238967 | A1 * | 8/2014 | Boyce | B60P 1/00 219/203 |
| 2014/0247473 | A1 * | 9/2014 | Kuhnen | B60J 1/17 359/238 |
| 2014/0310186 | A1 * | 10/2014 | Ricci | H04W 4/80 705/302 |
| 2016/0103358 | A1 * | 4/2016 | Tanaka | G06F 3/0412 349/12 |
| 2017/0098364 | A1 * | 4/2017 | Jaegal | B60Q 9/00 |
| 2018/0090876 | A1 * | 3/2018 | Klein | H01R 43/26 |
| 2018/0093611 | A1 * | 4/2018 | Kim | B60K 35/00 |
| 2018/0095586 | A1 * | 4/2018 | Cho | H04N 23/63 |
| 2018/0354367 | A1 * | 12/2018 | Mertens | B60K 35/00 |
| 2019/0005755 | A1 * | 1/2019 | Snider | B60J 1/10 |
| 2019/0168611 | A1 * | 6/2019 | Hélot | G06F 3/0488 |
| 2019/0213931 | A1 * | 7/2019 | Brubaker | B60Q 1/44 |
| 2020/0010048 | A1 * | 1/2020 | Park | H04W 52/0229 |
| 2020/0068724 | A1 * | 2/2020 | Kishimoto | H05K 5/0017 |
| 2023/0185115 | A1 * | 6/2023 | Mitogo | B60J 3/04 359/601 |

FOREIGN PATENT DOCUMENTS

| | | | |
|---|---|---|---|
| CN | 203854571 U | * | 10/2014 |
| DE | 102011080154 A1 | | 1/2013 |
| DE | 102013002747 A1 | | 8/2014 |
| DE | 102015014647 A1 | | 8/2017 |
| DE | 102016216415 A1 | * | 3/2018 |
| DE | 102016015114 A1 | | 6/2018 |
| EP | 3498508 A1 | | 6/2019 |
| WO | 2018015244 A1 | | 1/2018 |
| WO | WO-2019027440 A1 | * | 2/2019 |

* cited by examiner

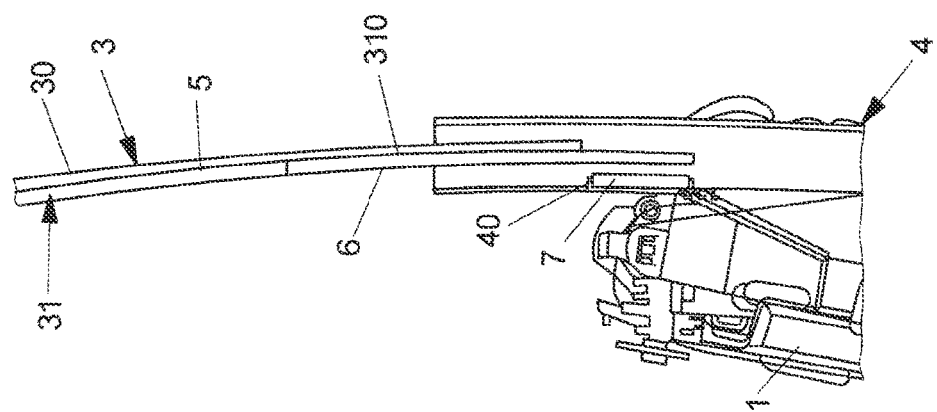
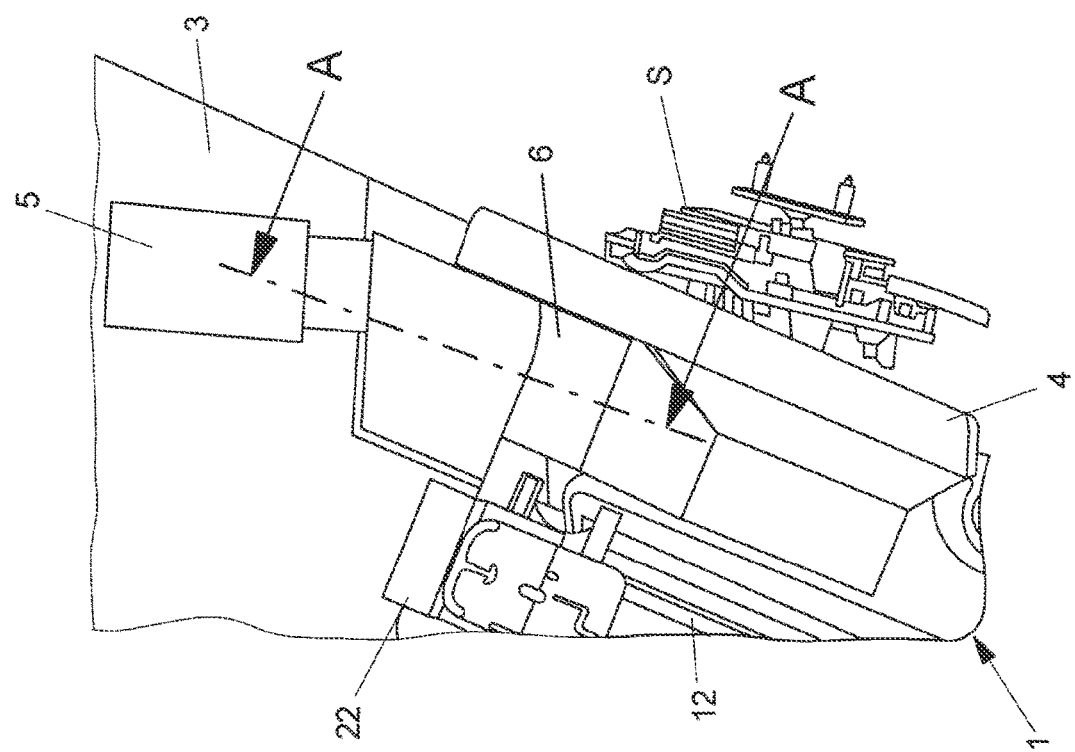

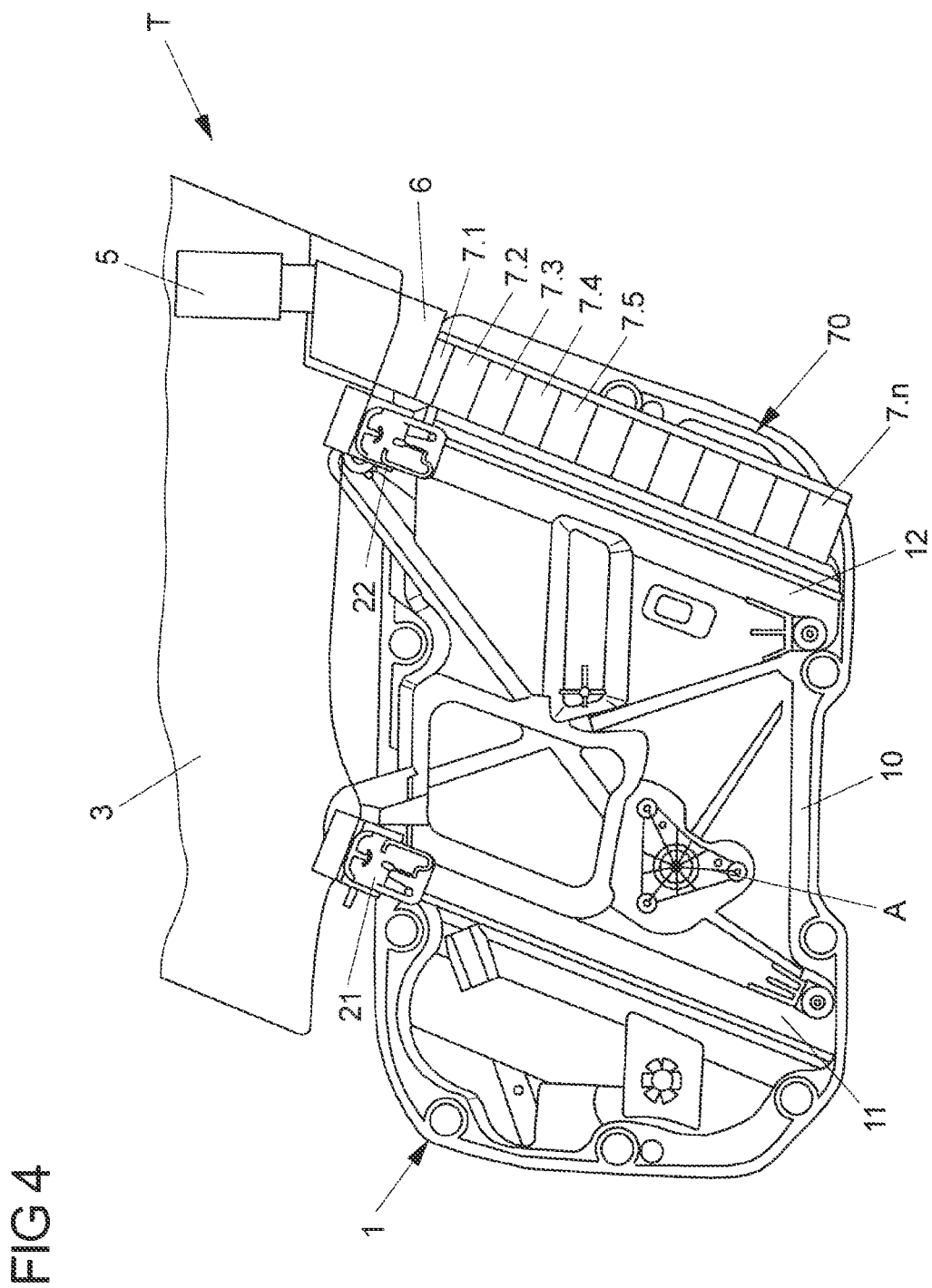

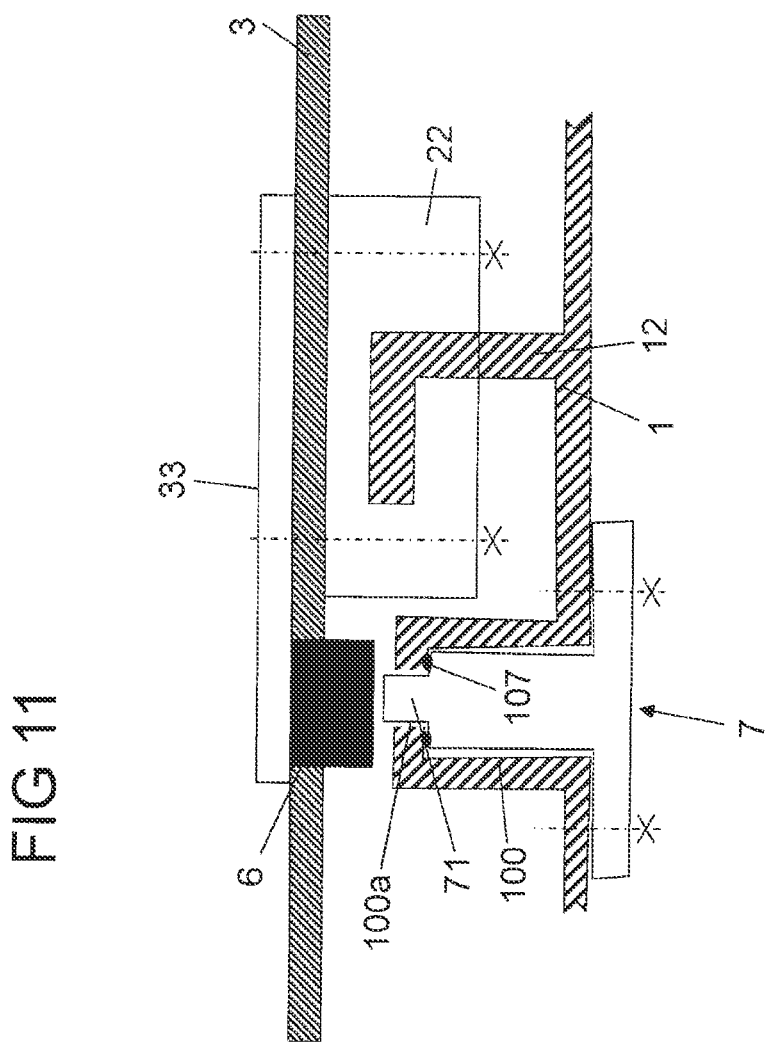

DOOR ASSEMBLY WITH TRANSMITTER AND RECEIVER UNITS FOR THE WIRELESS TRANSMISSION OF ENERGY AND/OR DATA

CROSS-REFERENCE TO RELATED APPLICATIONS

This application is the U.S. National Phase of PCT Application No. PCT/EP2019/075996 filed on Sep. 26, 2019, which claims priority to German Patent Application No. DE 10 2018 124 213.1, filed on Oct. 1, 2018, the disclosures of which are hereby incorporated in their entirety by reference herein.

TECHNICAL FIELD

The present disclosure relates to a door assembly including a vehicle door, a carrier component, which is provided in the vehicle door, and a window pane, which is adjustable relative to the carrier component, for a window opening on the vehicle door.

BACKGROUND

In generic door assemblies it is already known to provide at least one electric load on an adjustable window pane of a vehicle. It is possible, for example, to electrically heat and/or tint the window pane. Endeavors have also been made already to provide at least one display on a window pane of a motor vehicle in order to present information so as to be visible from outside or inside of the vehicle and/or to provide an input possibility for a user, for example via a touchscreen.

In this connection, it has so far been customary to transmit energy and/or data to a pane-side receiver unit via lines on the window pane. For this purpose, the lines possibly are guided in a complex way so that the adjustment of the window pane does not lead to a damage of the lines and, in operation of the vehicle, the lines do not lead to undesired rattling noises.

SUMMARY

Accordingly, a receiver unit for the wireless reception of energy and/or data is provided on the pane side, and a transmitter unit for the wireless transmission of energy and/or data to the pane-side receiver unit is provided on the side of the carrier component. Thus, for example, the pane-side receiver unit can be wirelessly supplied with electricity via the carrier-component-side transmitter unit and/or data can be transmitted to the pane-side receiver unit via the carrier-component-side transmitter unit. The wireless transmission is effected for example capacitively, inductively or via electromagnetic waves. Alternatively or in addition, a wireless data transmission can be effected on the basis of the WLAN standard, the Bluetooth standard or the NFC standard, or on the basis of RFID. Thus, the pane-side receiver unit and the carrier-component-side transmitter unit may be configured and equipped to receive and transmit data via WLAN, Bluetooth and/or NFC.

A transmission of data between the pane-side receiver unit and a carrier-component-side transmitter unit in principle can be unidirectional (from the transmitter unit to the receiver unit). Alternatively, however, a bidirectional data transmission can also be provided.

The carrier component, relative to which the window pane provided for a window opening on the vehicle door is adjustable, for example can be a door module carrier to which pre-mounted functional components of a window lifter for adjusting the window pane are fixed.

In one or more embodiments, the pane-side receiver unit for example is arranged in a cutout of the window pane. For the space-saving accommodation of the pane-side receiver unit it can be provided for example that the window pane is constructed of at least two layers and the cutout for the pane-side receiver unit is formed by an area of the window pane in which the window pane includes at least one layer less. For example, the window pane can include at least two interconnected layers of glass possibly with an interposed plastic film. In the area of the window pane accommodating the receiver unit at least one of these layers then is not present so that the reduced thickness of the window pane in this area can be utilized for accommodating the pane-side receiver unit.

The pane-side receiver unit can be partly potted. The pane-side receiver unit then consequently is encapsulated in a potting compound for protection. The pane-side receiver unit possibly can be attached to the window pane in its potted form or be attached to the window pane as a potted unit.

In another embodiment, the pane-side receiver unit is laminated into the material of the window pane or attached to the window pane, such as glued and/or clipped to the window pane. As an example, a potted pane-side receiver unit, in which the electronic components are encapsulated in a potting compound for protection, can be glued and/or clipped to the window pane.

As an example, a conductive adhesive is provided for gluing a pane-side receiver unit. This conductive adhesive is then used to conduct electrical signals and is electro-conductively connected to the pane-side receiver unit. Energy and/or data received on the pane-side receiver unit thus can be transmitted further via the conductive adhesive on the window pane, for example to an indicating unit provided on the window pane.

For storing energy and/or data, the pane-side receiver unit can be connected to at least one energy and/or data storage device. For example, this is a capacitor, such as a so-called super capacitor (briefly "super cap") and/or an accumulator. In this way, energy and/or data received by the pane-side receiver unit can be kept in stock at least temporarily, even if a connection to the carrier-component-side transmitter unit does no longer exist.

In one or more embodiments, the pane-side receiver unit at least partly protrudes from a pane surface of the window pane in a raised manner. The pane-side receiver unit here can be provided in a cutout of the window pane, but this is not absolutely necessary. A pane-side receiver unit at least partly protruding in a raised manner then for example can rest against a door-side portion also during the adjustment of the window pane in order to physically more tightly guide the window pane and to prevent bumping and/or rattling of the window pane such as in a moving vehicle (e.g. due to a non-optimal guidance of the window pane).

The carrier-component-side transmitter unit can at least partly be provided on a wet-space side of the carrier component facing the window pane or at least partly on a dry-space side of the carrier component facing away from the window pane. For example, a cavity between a door outer skin facing the outer space and a door inner skin facing the vehicle interior space, which is defined within the vehicle door, can be divided into a wet space and a dry space. For example, a separation between wet space and dry space is effected via a door module carrier so that the window pane can be lowered within the wet space, and electronic components to be protected from moisture can be accommodated in the dry space. In accordance with the proposed solution, a carrier-component-side transmitter unit can be provided both on a wet-space side of the carrier component and on a dry-space side of the carrier component. When the transmitter unit is arranged on the wet-space side, a physical proximity to a pane-side receiver unit can be realized comparatively easily. To connect the carrier-component-side transmitter unit arranged on the wet-space side to electronic components which are accommodated on the dry-space side, however, e.g. a (sealed) through opening is to be provided in the carrier component. Such a difficulty, however, does not exist when the carrier-component-side transmitter unit is mounted on a dry-space side of the carrier component. Then, however, it possibly is more expensive to ensure that the receiver unit, which is provided on the window pane on the wet-space side, can properly be wirelessly coupled with the carrier-component-side transmitter unit in order to be able to transmit energy and/or data without errors.

For example, the carrier-component-side transmitter unit is provided on an area of reduced wall thickness. The area of reduced wall thickness can be provided on the carrier component itself or on a component fixed thereto, for example on a holding part for a door lock. The arrangement of the transmitter unit in the area of reduced wall thickness here may be used when the transmitter unit is provided on the dry-space side of the carrier component.

In one or more embodiments, the carrier component is formed by a door module carrier or by a holding part fixed to the door module carrier and carrying at least one door lock of the vehicle door. To the holding part carrying a door lock at least one further functional component of the vehicle door can of course also be fixed, such as for example an outer door handle and/or an inner door handle.

When a carrier component is formed by a door module carrier, the carrier-component-side transmitter unit for example is provided close to or on a guide rail of the door module carrier provided for the adjustment of the window pane. The guide rail is here is integrally formed on the carrier component and correspondingly molded thereto. Such a guide rail in a manner known per se serves for guiding a carrier connected to the window pane. The carrier-component-side transmitter unit then can be integrated into the material of the guide rail, may at least partly be embedded into the material of the guide rail and/or at least partly be overmolded by the same. Due to the physical proximity of the guide rail to the window pane to be adjusted, a coupling with the pane-side receiver unit for the wireless transmission of energy and/or data possibly is facilitated thereby.

Alternatively or in addition, the carrier-component-side transmitter unit is accommodated in a control unit or coupled with a control unit which is provided on or in the vehicle door for controlling a power-operated adjustment and/or arrestment of the vehicle door. Correspondingly, a control unit can be provided for controlling a drive motor by means of which the vehicle door can be opened and/or closed in a power-operated way. Alternatively or in addition, a door arrester of the vehicle door is controllable by means of the control unit. By means of such a door arrester, the vehicle door can be arrested in an occupied adjustment position in an electronically controlled way. For example, the arrestment can be maintained until it is detected by means of a sensor device on or in the vehicle door that in a desired adjustment path for the vehicle door no obstacle is present (any longer). By accommodating the carrier-component-side transmitter unit in such a control unit present already or by coupling with such a control unit, the wireless transmission of energy and/or data can be integrated into the vehicle door without having to provide more installation space or at least substantially more installation space for this purpose.

In a closed position of the window pane, the carrier-component-side transmitter unit can be disposed opposite the pane-side receiver unit. The transmitter unit and the receiver unit may be arranged and configured in such a way that a transmission of energy and/or data from the transmitter unit to the receiver unit is possible at least or only in the closed position of the window pane. For example, the carrier-component-side transmitter unit and the pane-side receiver unit are adjacent to each other merely in the closed position of the window pane so that an inductive or capacitive coupling is given for the transmission of energy and/or data. In this way, information for example can also be transmittable to an indicating unit coupled with the receiver unit only in the closed position of the window pane. When in turn an energy accumulator is provided and/or the display unit also is configured for the currentless indication of information, a coupling between transmitter unit and receiver unit, which is provided merely in the closed position of the window pane, however, does not preclude a permanent display of information on the indicating unit.

Furthermore, a plurality of carrier-component-side transmitter units can be provided, which are successively arranged along an adjustment path along which the window pane is adjustable. Thus, on adjustment of the window pane an individual pane-side receiver unit is guided past the transmitter units succeeding each other along the adjustment path and correspondingly can couple with the same for example capacitively or inductively. Thus, energy and/or data can be transmitted to the pane-side receiver unit along a part or even along the entire adjustment path of the window pane.

Correspondingly, one or more embodiments, that (due to the arrangement of the transmitter units) transmission areas of at least two successive carrier-component-side transmitter units are provided to overlap each other. As an example, transmission areas of two successive carrier-component-side transmitter units each can overlap so as to ensure an uninterrupted transmission of energy and/or data to the pane-side receiver unit along the adjustment path of the window pane. In one or more embodiments, the transmitter units themselves can therefor also be arranged to at least partly overlap each other.

As an example, the pane-side receiver unit and/or the carrier-component-side transmitter unit can comprise at least one induction coil in order to inductively receive and transmit energy and/or data.

As explained already, at least one indicating unit can be provided on the vehicle door, in particular on the window pane, which is coupled with the pane-side receiver unit in order to transmit energy and/or data to the indicating unit. The indicating unit such as can comprise a display. In one design variant, such a display is designed as an e-paper display. In a development, such an e-paper display offers the possibility to display information also in a currentless way, until the display is newly actuated. In such a variant it may be possible, for example, to display certain types of information on the indicating unit on the window pane also with a lowered and hence partly or completely open window pane, although coupling for the wireless transmission of energy to the pane-side receiver unit is possible merely in a closed position of the window pane.

As an example, the indicating unit together with the pane-side receiver unit can form a function module. The function module for example constitutes a pre-testable unit which is attached to the window pane or integrated therein, and in which energy wirelessly received by means of the pane-side receiver unit is utilized for operating the indicating unit and/or data received by means of the pane-side receiver unit are transmitted to the indicating unit. For actuating the indicating unit, such a function module can comprise at least one microcontroller. As an example, such a microcontroller can include an integrated data transceiver.

An indicating unit—such as when integrated on the pane side—can be formed by means of at least one OLED and/or can comprise at least one touchscreen. Furthermore, in a possible design variant the pane-side receiver unit can also be coupled with a sensor system for activating functions, which is fed with received energy by means of the pane-side receiver unit. For example, there can be provided at least one capacitive proximity sensor. A function to be activated thereby for example can be the control of a lighting of a display of the indicating unit.

The types of information to be represented on the indicating unit for example can comprise a QR code, a name, a state of charge (such as a state of charge of the electromotively driven vehicle including the door assembly), a rental state (for a rented vehicle), environment information and/or videos.

BRIEF DESCRIPTION OF THE DRAWINGS

The attached Figures by way of example illustrate possible design variants of the proposed solution.

In the drawings:

FIG. 2 shows an enlarged section of the door assembly of FIG. 1 with an attached door lock in the vicinity of the lock carrier;

FIG. 2A shows a sectional representation along the sectional line A-A of FIG. 2;

FIG. 4 in a view corresponding with FIG. 1 shows another design variant of the proposed solution, in which a longitudinally extended array of transmitter units succeeding each other along an adjustment path of the window pane is provided on the door module carrier;

FIG. 11 partially and in a sectional representation shows another design variant in which the transmitter unit is arranged in a receptacle of a door module carrier and partly protrudes through a through opening of the receptacle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
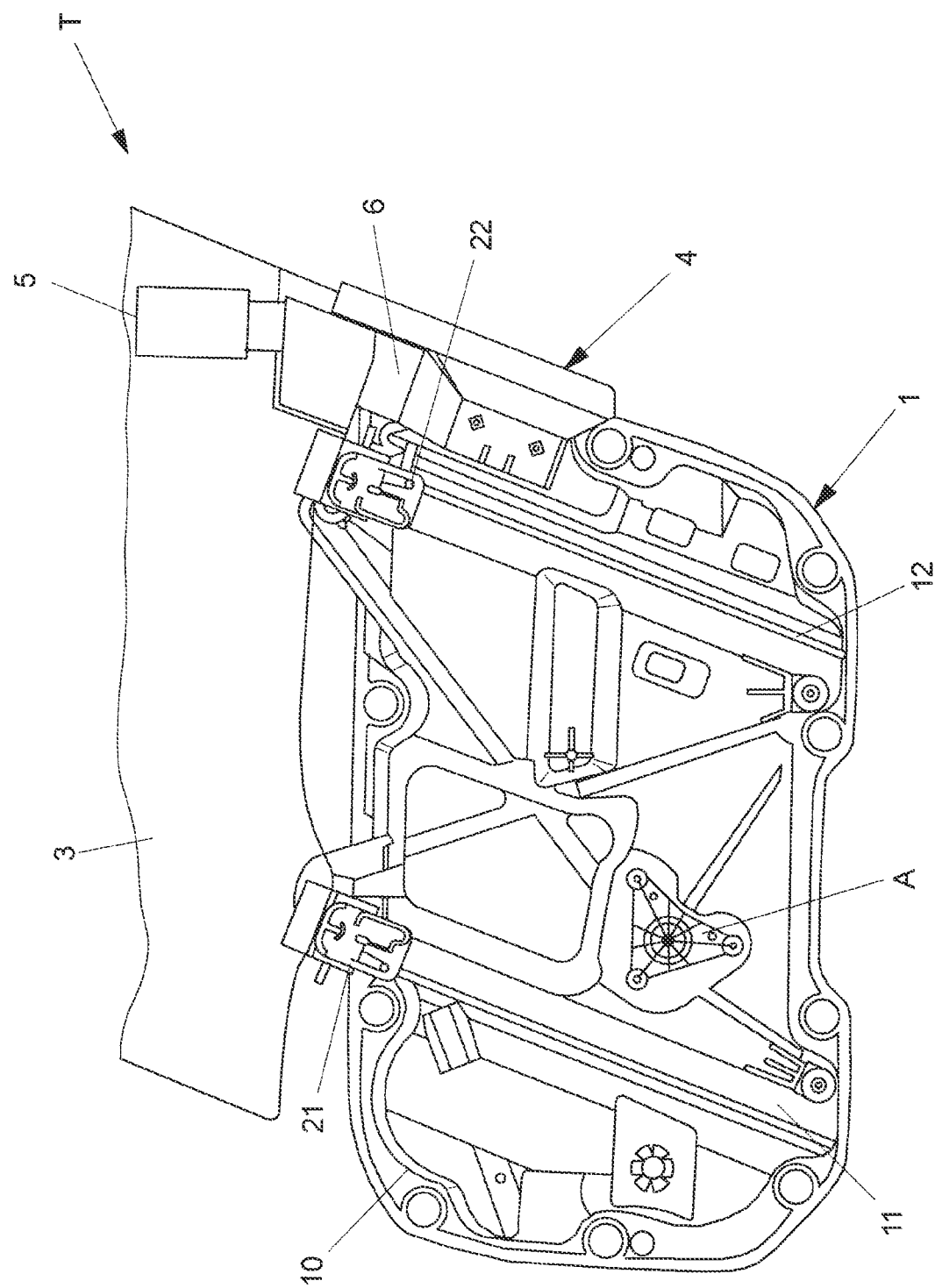
FIG. 1 partially and in a side view shows a door assembly comprising a carrier component in the form of a door module carrier with a window pane adjustably mounted thereon, a pane-side integrated, e.g. inductive receiver unit and a display integrated on the pane side, which is coupled therewith, as well as a carrier-component-side inductive transmitter unit on a multifunctional holding part in the form of a lock carrier.

FIG. 1 shows a side view of a door assembly T comprising a planar door module carrier 1 on which functional components of a vehicle door are arranged. The door module carrier 1 may carry an electromotive drive A for the adjustment of a window pane 3. Via carriers 21, 22, this window pane 3 is shiftably guided on guide rails 11 and 12 which are integrated on the door module carrier 1. Via the carriers 21, 22, the window pane 3 is adjustable relative to the door module carrier 1 in a guided manner. When lowering the window pane 3 by means of the electromotive drive A and the carriers 21, 22 driven thereby, the window pane 3 is adjusted along a base surface 10 of the door module carrier 1 on which the guide rails 11 and 12 are integrated and which faces a wet space inside the vehicle door. In a manner known per se, the door module carrier 1 separates a wet space on a vehicle door, which is present between a door outer skin of the vehicle door and the door module carrier 1, from a dry space facing the vehicle interior space.

On the window pane 3 of the door assembly T of FIG. 1 an indicating unit in the form of a display 5 is integrated. Via the display 5, for example, different types of information can be represented so as to be visible for a user from within the vehicle or from outside the vehicle. As an example for car sharing applications it can be provided in this connection that a QR code, a name, a state of charge, a rental state and/or environment conditions, such as environment information such as temperature or air humidity, can be indicated by means of the display. For example, the display 5 can also be configured as an e-paper display by means of which information once displayed remains visible also in a currentless state.

For energizing the display 5 and for transmitting data to the display 5 there is provided a receiver unit 6 arranged on the window pane 3. The receiver unit 6 operates for example inductively and correspondingly integrates at least one induction coil. In addition, the receiver unit 6 can be part of a function module which comprises at least one microcontroller. The receiver unit 6 is electroconductively connected to the display 5 in order to transmit energy and/or data received on the receiver unit 6 to the display 5.

In the present case, the receiver unit 6 is arranged in the vicinity of a lower edge and close to a longitudinal edge of the window pane 3 and is provided in a cutout 310 on the window pane 3, as this is illustrated in detail with reference to the sectional representations of FIGS. 2A and 3.

On the side of the carrier component, a transmitter unit 7 is associated with the pane-side receiver unit 6. The transmitter unit 7 is designed and configured for the wireless transmission of energy and/or data to the pane-side receiver unit 6. The carrier-component-side transmitter unit 7 is arranged on a multi-function holding part in the form of a lock carrier 4. This lock carrier 4 is fixed at an edge region of the base surface 10 of the door module carrier 1 and may carry a door lock S of the vehicle door. Possibly, an outer door handle and/or an inner door handle can also be fixed to the lock carrier 4.

Figure 3:
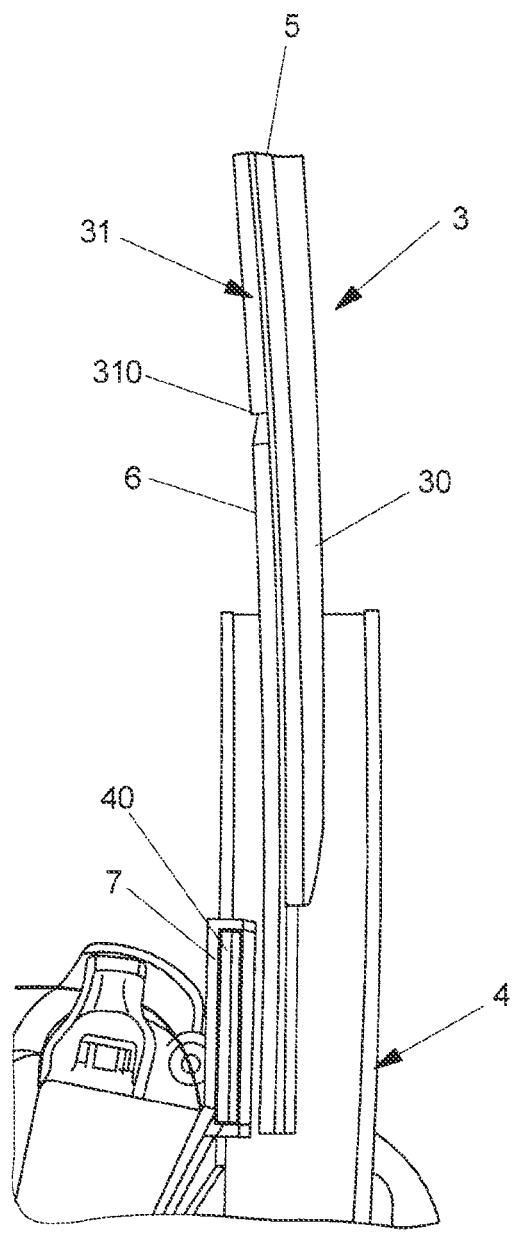
FIG. 3 shows another sectional representation of the door assembly clearly illustrating the arrangement of the pane-side receiver unit and the arrangement of the carrier-component-side transmitter unit on the lock carrier.

The lock carrier 4 forms a receptacle 40 to be seen in the sectional representation of FIG. 2A or FIG. 3, in which the transmitter unit 7 is accommodated completely. The position of the transmitter unit 7 here is chosen in such a way that the pane-side receiver unit 6 is disposed opposite the carrier-component-side transmitter unit 7 when the window pane 3 is in a closed position. In the closed position of the window pane 3, energy and/or data thus can be wirelessly transmitted from the transmitter unit 7 to the receiver unit 6. For this purpose, a distance between the receiver unit 6 and the transmitter unit 7 in the range of less than 10 mm, such as in the range of less than 6 mm for example is provided. Due to the edge-side arrangement of receiver unit 6 and transmitter unit 7, and the arrangement of the transmitter unit 7 on the door module carrier 1, this can easily be achieved.

As can be taken from the sectional representations of FIGS. 2A and 3, the window pane 3 is of multilayer construction and may include two interconnected glass panes 30 and 31. In principle, a plastic film 32 can also be sandwiched between these glass panes 30 and 31 in a manner known per se. In the present case, the display 5 is received in an area between the two glass panes 30 and 31. The function module with the pane-side receiver unit 6 furthermore is provided in an area close to the lower edge of the window pane 3 in which the one, inner glass pane 31, i.e. the glass pane facing the vehicle interior space, is shortened and hence not present. On the inside of the window pane 3 a cutout 310 is formed thereby, in which the receiver unit 6 can be mounted without (substantially) increasing the thickness of the window pane 3. Thus, the receiver unit 6 in the cutout 310 merely is fixed to the one glass pane 31.

In the illustrated exemplary embodiment, the receiver unit 6 projects beyond the lower edge of the window pane 3 so that in the closed position of the window pane 3 its induction coil faces the transmitter unit 7. The receiver unit 6 here is of comparatively flat design and is formed approximately disk-shaped or plate-shaped. The receiver unit 6 therefor can have a flat housing. Alternatively or in addition, the electronics of the receiver unit 6 are fixed to the window pane 3 in a potting compound encapsulated in a plate-like manner, for example glued into the cutout 310.

Figure 5A:
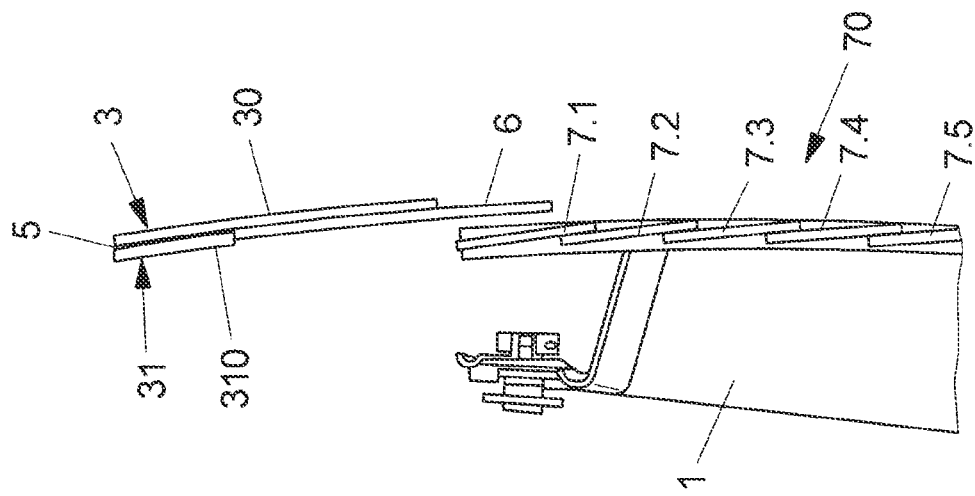
FIG. 5A shows a sectional representation along the sectional line A-A of FIG. 5.
Figure 5:
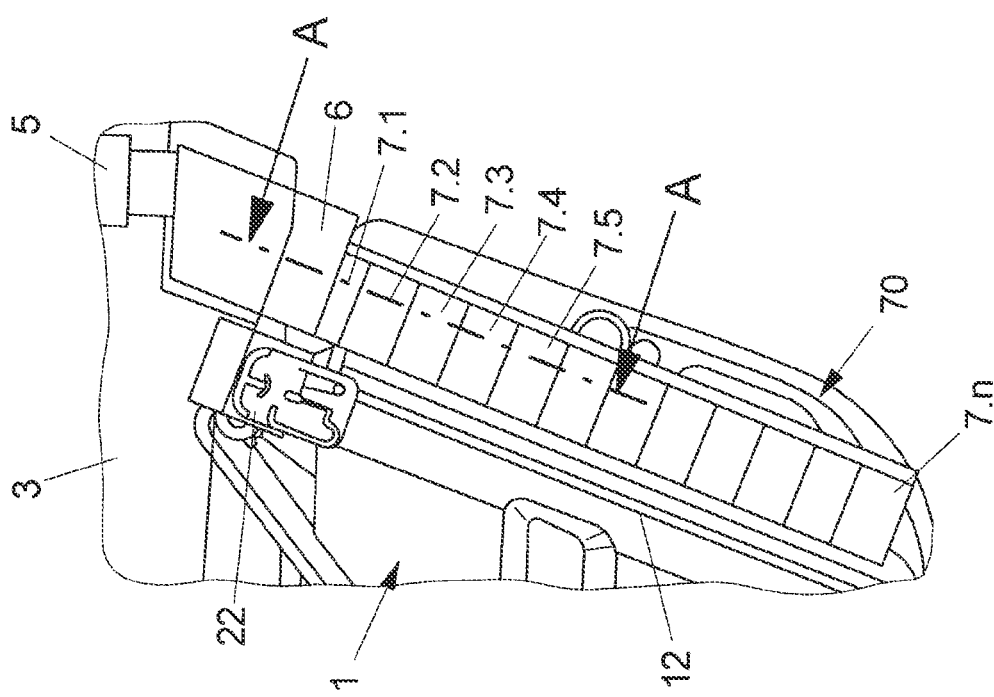
FIG. 5 shows an enlarged section of the door assembly of FIG. 4 with a view to the array of transmitter units.
Figure 6:
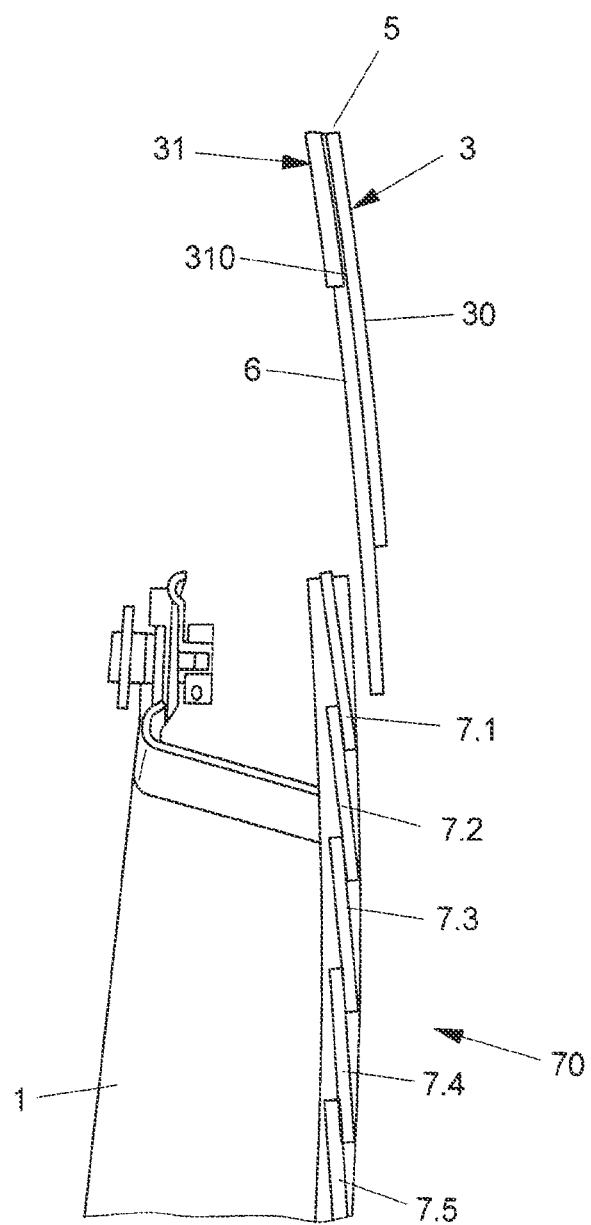
FIG. 6 shows an additional sectional representation of the design variant of FIGS. 4, 5 and 5A.

While in the design variant of FIGS. 1 to 3 a wireless transmission of energy and/or data from the carrier-component-side transmitter unit 7 to the pane-side receiver unit 6 is possible merely in the closed position of the window pane 3, the design variant of FIGS. 4 to 6 provides an arrangement in which the pane-side receiver unit 6 can be wirelessly supplied with energy and/or data along the entire adjustment path of the window pane 3.

For this purpose, a longitudinally extended transmitter array 70 is provided on the base surface 10 of the door module carrier 1. This longitudinally extended transmitter array 70 comprises a plurality of transmitter units 7.1 to 7.$n$ succeeding each other along the adjustment path specified by the guide rails 11 and 12 for the window pane 3. When the window pane 3 is lowered, the pane-side receiver unit 6 is shifted along the transmitter array 70 so that the pane-side receiver unit 6 always faces one of the successive transmitter units 7.1 to 7.$n$ along the adjustment path. Along the permitted adjustment path of the window pane 3, the receiver unit 6 thus can continuously be supplied with energy and/or data via the successive transmitter units 7.1 to 7.$n$ of the transmitter array 70. For example, each of the transmitter units 7.1 to 7.$n$ therefor each includes a transmitting coil.

As can be taken from the sectional representations of FIGS. 5A and 6, the successive transmitter units 7.1 to 7.$n$ in the design variant of FIGS. 4 to 6 are arranged to at least partly overlap each other so that two successive transmitter units, for example 7.1/7.2, 7.2/7.3 or 7.3/7.4, in part physically overlap each other. It thereby is ensured that transmitting areas defined by the respective transmitter unit 7.1 to 7.$n$, in which the receiver unit 6 must be present in order to wirelessly receive energy and/or data from the respective transmitter unit 7.1 to 7.$n$, overlap each other. In this way, a continuous coupling of the pane-side receiver unit 6 with at least one transmitter unit 7.1 to 7.$n$ of the transmitter array 70 of the door module carrier 1 is ensured in every possible adjustment position of the window pane 3.

Alternatively or in addition, an energy storage device or buffer can be provided on the pane side, which allows a display of information also with a (partly) open window pane 3 without having to provide transmitter units 7.1 to 7.$n$ to be wirelessly coupled with the receiver unit 6 on the door module carrier 1 along the entire adjustment path of the window pane 3.

Figure 7:
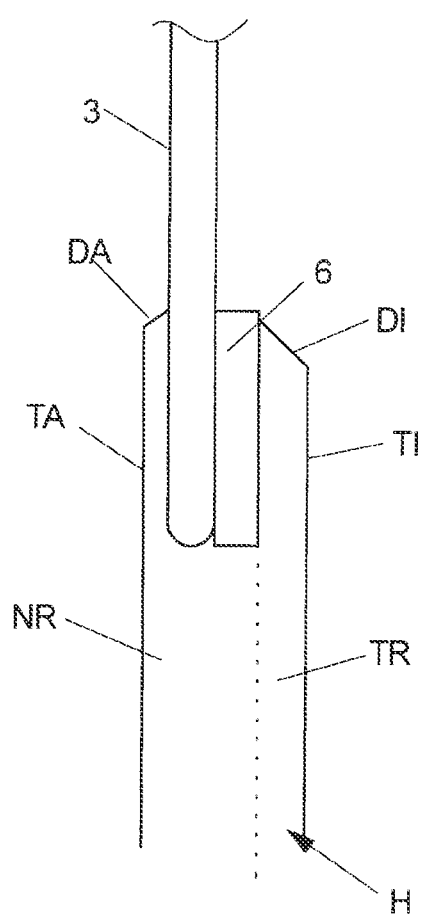
FIG. 7 partially and in a sectional view shows another design variant of a door assembly comprising a window pane and a receiver unit fixed thereto and protruding from a pane surface of the window pane in a raised manner.

With the sectional representation of FIG. 7 another design variant is illustrated, in which the receiver unit 6 protrudes from the window pane 3 in a raised manner in the vicinity of the lower edge of the window pane 3. When the window pane 3 is lowered, the receiver unit 6 thus is disposed on a side of the window pane 3 facing a dry space TR. This dry space TR is sealed with respect to the wet space NR via the door module carrier 1, which is formed in a cavity HR of the vehicle door between a door outer skin TA and a door inner skin TI. In an area close to the sill, the window pane can be moved out of this cavity HR between two seals DA and DI in order to close a window opening.

In the design variant of FIG. 7, in contrast to the design variants of FIGS. 1 to 3 and 4 to 6, the receiver unit 6 is at least partly accessible from the vehicle interior space when the window pane 3 is closed. Thus, an upper side of the receiver unit 6 for example extends beyond the inner seal DI. The pane-side receiver unit 6 thereby can be accessible for a fitter, but also for a user. For example, the pane-side receiver unit 6 hence is accessible for maintenance and repair purposes, but also for example for a possible control of the display 5.

Figure 8:
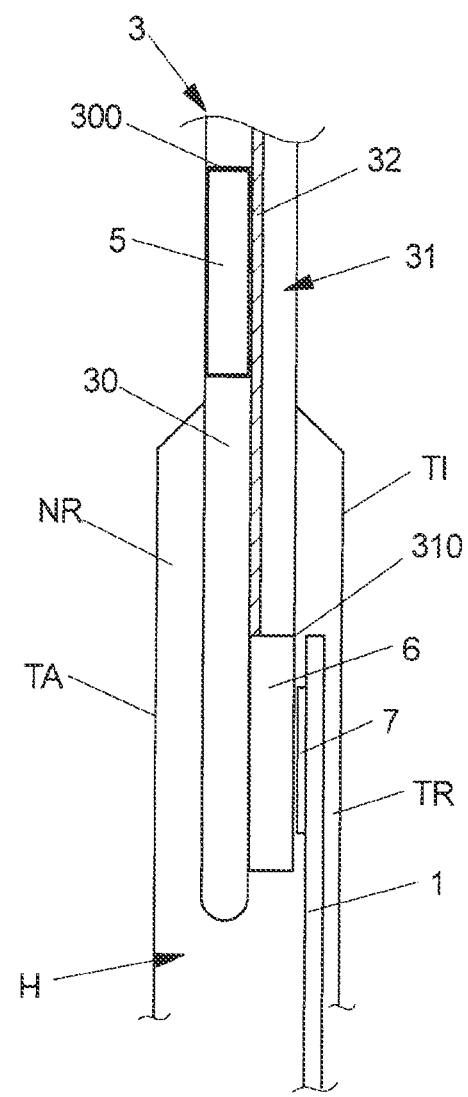
FIG. 8 in the view corresponding with FIG. 7 partially shows another design variant comprising a window pane of multilayer construction, in which in a cutout of one layer a display and in a cutout of another layer a receiver unit are accommodated.

The sectional representation of FIG. 8 again illustrates another design variant in which the display 5 and the receiver unit 6 are integrated at different sides of the window pane 3. The display 5 here is accommodated in a recess 300 of an outer glass pane 30 of the window pane 3. This glass pane 30 along with a further inner glass pane 32 and an interposed plastic film 32 forms a layer of the window pane 3 of multilayer construction. The pane-side receiver unit 6 in turn is received in a cutout 310 of the inner glass pane 31 in the vicinity of the lower edge of the pane, and in the closed position of the window pane 3 is present within the cavity HR of the vehicle door. For a transmission of energy and/or data, which the receiver unit 6 has wirelessly received from the transmitter unit 7, to the display 5, at least one signal conductor 65 extends along the plastic film 32 between the receiver unit 6 and the display 5.

Figure 9:
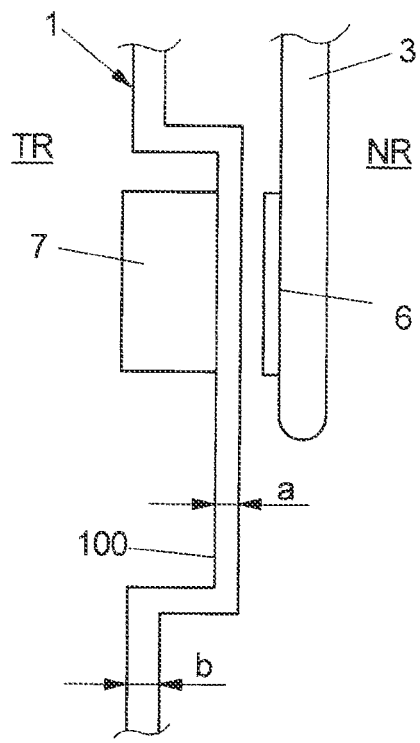
FIG. 9 partially and in a sectional representation shows another design variant of the proposed solution by illustrating a door module carrier, in which a transmitter unit is arranged in an area of reduced wall thickness, and a window pane disposed in a closed position, on which a receiver unit is present.
Figure 10:
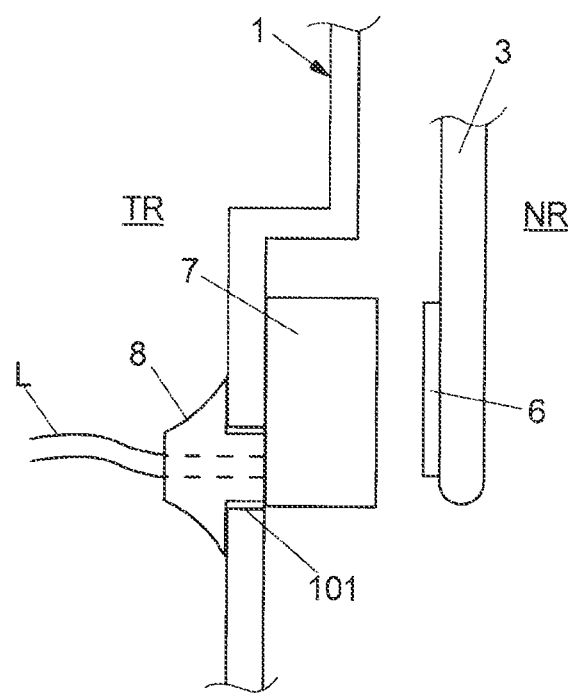
FIG. 10 in a sectional representation corresponding with FIG. 9 shows another design variant comprising a transmitter unit which is arranged on a wet-space side of a door module carrier, wherein a signal line is guided to the transmitter unit through a sealed through opening on the door module carrier in order to supply the transmitter unit with energy and/or data.

FIGS. 9 and 10 by way of example illustrate possible mounting options of the carrier-component-side transmitter unit 7.

In the design variant of FIG. 9, a receptacle 100 for the transmitter unit 7 is formed on the door module carrier 1 (or alternatively on the lock carrier 4 fixed to the door module carrier 1). The transmitter unit 7 here is mounted on a wall of the door module carrier 1, which has a reduced wall thickness a as compared to an adjacent wall of the door module carrier 1. The wall thickness a in the vicinity of the receptacle 100 can be reduced by at least 30%, such as by at least 50%, as compared to a wall thickness b in adjacent areas of the door module carrier 1. The reduction of the wall thickness in the vicinity of the receptacle 100 facilitates the wireless transmission of energy and/or data to the pane-side receiver unit 6 which is arranged on an opposite side of the door module carrier 1. In the illustrated design variant, the transmitter unit 7 can be arranged on a dry-space side of the door module carrier 1 so as to be protected from moisture, while the window pane 3 with the receiver unit 6 arranged thereon faces a wet-space side of the door module carrier 1.

In the design variant of FIG. 10, the carrier-component-side transmitter unit 7 is fixed on a wet-space side of the door module carrier 1 and hence directly, i.e. at a distance, but not spaced apart by a portion of the door module carrier 1, faces the pane-side receiver unit 6—at least in the closed position of the window pane 3. To protect the carrier-component-side transmitter unit 7 from moisture within the wet space NR, electronic components of the transmitter unit 7 can be potted, for example.

For an electrical connection of the transmitter unit 7 to a power supply and/or a superordinate control unit a signal line L is provided. This signal line L is guided from the dry space TR via a through opening 101 in the door module carrier 1 to the transmitter unit 7. To prevent the ingress of moisture in the dry space TR through the through opening 101, the signal line L is guided over a sealing grommet 8 which is inserted into the through opening 101.

Partially and in a sectional representation, FIG. 11 shows another design variant of a proposed door assembly. For adjusting the window pane 3, a carrier 22 here is rigidly connected to a pane adapter 33. The pane adapter 33 for example can be firmly glued to the window pane 3. The carrier 22, as already explained above, furthermore is shiftably guided on a guide rail 12 which in the present case is integrally formed on the door module carrier 1. In physical proximity to the guide rail 12, there is provided a receptacle 100 for the transmitter unit 7. The receptacle 100 here for example is pocket-shaped and is accessible from a dry-space side of the door module carrier 1 in order to insert the transmitter unit 7.

On its bottom, the receptacle 100 includes a through opening 100a. The transmitter unit 7 properly mounted in the receptacle 100 protrudes through this through opening 100a with a transmitter part 71. Via the receptacle 100 protruding in the direction of the window pane 3 on the door module carrier 1, the transmitter unit 7 is positioned in close proximity to the pane-mounted receiver unit 6, when the window pane 3 is in its closed position. By the transmitter part 71 protruding through the through opening 100a, a distance to the pane-mounted receiver unit 6 can be reduced to few millimeters.

To prevent the ingress of moisture via the through opening 100a of the receptacle 100 across the transmitter unit 7 into the dry space, a seal 107 is provided. This seal 107 extends around the transmitter part 71 and seals the edge of the through opening 100a with respect to the transmitter unit 7 so that no moisture can get past the transmitter unit 7 into the dry space.

Corresponding to the representation of FIG. 11, the receptacle 100 for the transmitter unit 7 is disposed in an area of the door module carrier 1 adjacent to the guide rail 12. The position of the transmitter unit 7 specified by the receptacle 100 thus is disposed at a defined distance to the guide rail 12. When manufacturing the door module carrier 1 as an injection-molded part, a shape-bound distance between the transmitter unit 7 and the guide rail 12 thus is defined. The position of the transmitter unit 7 specified via the receptacle 100 hence in turn allows the transmitter unit 7 to be exactly positioned with respect to the pane-side receiver unit 6, such as when the receiver unit 6 is firmly connected to the pane adapter 33 (for example via a clip connection) or is integrated therein (for example encapsulated or overmolded) and, as shown in FIG. 11, especially with this pane adapter 33 the carrier 22 guided on the guide rail 12 is fixed as well.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 door module carrier (carrier component)
10 base surface
100 receptacle
100a through opening
101 through opening
107 seal
11, 12 guide rail
21, 22 carrier
3 window pane
30 glass pane
300 cutout
31 glass pane
310 cutout
32 plastic film
33 pane adapter
4 lock carrier
40 receptacle
5 display (indicating unit)
6 receiver unit
65 signal conductor 7 transmitter unit
7.1, ..., 7.n transmitter unit
70 transmitter array
71 transmitter part
8 sealing grommet
A drive
a, b wall thickness
DA, DI seal
H cavity
L signal line
S door lock
T door assembly
TA door outer skin
TI door inner skin While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A door assembly comprising:
    a vehicle door;
    a carrier component disposed in the vehicle door and configured to carry at least one functional component of the vehicle door;
    a windowpane configured to be adjusted relative to the carrier component to form a window opening,
    a pane-side receiver unit at the windowpane, the pane-side receiver unit being configured to wirelessly receive at least one of energy and data; and
    a carrier-component-side transmitter unit at the carrier component, the carrier-component-side transmitter unit being configured to wirelessly transmit at least one of the energy and the data to the pane-side receiver unit, wherein the windowpane defines a cutout and the pane-side receiver unit is disposed in the cutout of the windowpane, wherein the windowpane includes a first portion, formed by a first number of layers, and a second portion, formed by a second number of layers, and wherein the second number of layers is less than the first number of layers and the second portion defines the cutout.

2. The door assembly of claim 1, wherein the pane-side receiver unit is at least partly encapsulated in a potting compound.

3. The door assembly of claim 1, wherein the pane-side receiver unit is at least one out of laminated, glued and clipped to the windowpane.

4. The door assembly of claim 1, further comprising:
    a conductive adhesive configured to adhere the pane-side receiver unit to the windowpane and to conduct electrical signals to the pane-side receiver unit.

5. The door assembly of claim 1, wherein the pane-side receiver unit is connected to at least one out of: a data storage device and at least one energy device.

6. The door assembly of claim 1, wherein at least a portion of the pane-side receiver unit is raised with respect to a pane surface of the windowpane.

7. The door assembly of claim 1, wherein the carrier component includes a first portion having a first wall thickness and a second portion having a second wall thickness, wherein the second wall thickness is less than the first wall thickness and the carrier-component-side transmitter unit is disposed on the second portion.

8. The door assembly of claim 1, wherein the carrier component is formed by a door module carrier or a holding part fixed to the door module carrier, wherein the holding part is configured to carry at least one vehicle door lock.

9. The door assembly of claim 8, wherein the carrier component is formed by the door module carrier and the door module carrier includes a guide rail configured to guide the windowpane, and wherein the carrier-component-side transmitter unit is disposed on the guide rail.

10. The door assembly of claim 9, wherein the carrier-component-side transmitter unit is integrally formed with the guide rail.

11. The door assembly of claim 1, further comprising:
    a control unit disposed on or in the vehicle door and configured to control a power-operated adjustment or power-operated fixation of the vehicle door, wherein the carrier-component-side transmitter unit is disposed in the control unit or coupled to the control unit which is provided on or in the vehicle door.

12. The door assembly of claim 1, wherein when the windowpane is in a closed position, the carrier-component-side transmitter unit is disposed opposite the pane-side receiver unit.

13. The door assembly of claim 1, further comprising:
    a plurality of carrier-component-side transmitter units including the carrier-component-side transmitter unit, wherein the window pane is adjustable along an adjustment path and each of the carrier-component-side transmitter units of the plurality of carrier-component-side transmitter units are successively arranged along the adjustment path.

14. The door assembly of claim 13, wherein each of the carrier-component-side transmitter units of the plurality of carrier-component-side transmitter units include a transmitting area and the transmitting areas of at least two successive carrier-component-side transmitter units of the plurality of carrier-component-side transmitter units overlap each other.

15. The door assembly of claim 1, wherein at least one of the pane-side receiver unit and the carrier-component-side transmitter unit includes at least one induction coil.

16. The door assembly of claim 1, further comprising:
    an indicating unit provided on the vehicle door and coupled to the pane-side receiver unit.

17. The door assembly of claim 16, wherein the indicating unit includes an e-paper display.

18. The door assembly of claim 16, wherein the indicating unit and the pane-side receiver unit collectively form a function module provided with a microcontroller configured to control the indicating unit.

* * * * *